United States Patent [19]
Cota

[11] 4,085,424
[45] Apr. 18, 1978

[54] PHASE-COMPARISON LOGIC CIRCUIT FOR DUAL SIGNAL TELEVISION RECEPTION

[75] Inventor: Dennis Cota, VS-Villingen, Germany

[73] Assignee: Saba Schwarzwaelder Apparate-Bau-Anstalt August Schwer Soehne GmbH, Villingen-Schwenningen, Germany

[21] Appl. No.: 778,579

[22] Filed: Mar. 17, 1977

[30] Foreign Application Priority Data

Jun. 18, 1976 Germany .............................. 2627338
Oct. 13, 1976 United Kingdom ............... 41658/76

[51] Int. Cl.² ............................................. H04N 5/04
[52] U.S. Cl. ................................................. 358/181
[58] Field of Search .................. 358/183, 181, 148, 22

[56] References Cited

U.S. PATENT DOCUMENTS

| | | | |
|---|---|---|---|
| 3,082,294 | 3/1963 | Dean | 358/181 X |
| 3,689,694 | 9/1972 | Thorpe | 358/183 |
| 3,943,280 | 3/1976 | Kimura et al. | 358/183 |

Primary Examiner—John C. Martin
Assistant Examiner—Aristotelis M. Psitos
Attorney, Agent, or Firm—Norman J. O'Malley; Theodore D. Lindgren; Robert T. Orner

[57] ABSTRACT

A logic circuit providing a bi-level signal, one level of which agrees with periods of time during which the video signal corresponds to a quadrant of a first broadcast television program, said quadrant being free from horizontal and vertical synchronizing pulses present in the video signal of a second broadcast program.

7 Claims, 4 Drawing Figures

PHASE-COMPARISON LOGIC CIRCUIT FOR DUAL SIGNAL TELEVISION RECEPTION

BACKGROUND OF THE INVENTION

The present invention concerns a phase-comparison circuit for use in the circuit system described in co-pending U.S. application Ser. No. 771,903, relating to a circuit system for a television receiver, said circuit system operating to replace a changing quadrant of the picture of a first transmitted television program with an equivalent-size sector of a second transmitted program.

Prior art television receivers in which more than one program can be viewed simultaneously have been constructed with an additional smaller television screen being placed adjacently to the main screen. However, the method of construction is very expensive because it requires a complete duplication of parts, including the television picture tube.

A method for the elimination of the additional television tube has been accomplished in television broadcast studios where the co-joining or mixing of at least one part of an additional television picture into a blanked sector of the main picture is common practice. However, the method of combining a plurality of television images taken by different in-station television cameras and reproduced together on the same receiver screen is simplified by the fact that the deflection signals for the different television camera tubes have identical timing. Thus, the described method is limited to television studio systems operating under closed-circuit conditions. The same limitation also applies to known methods for the simultaneous showing of several video signals originating from different in-station television cameras in which different saw-tooth signals are applied to the different television cameras, but where the frequencies of the signals are related to each other by integral fraction.

The simultaneous reproduction of television picture signals beamed by various television stations onto one television receiver screen has been accomplished by the blending of a reduced image of a second program into the televised picture of the main program. However, the method requires memory capability for the purpose of reducing the size of the picture of the second program and for the purpose of overcoming the difference in time between the synchronizing signals broadcast by the two stations. The size reduction of the picture of the second program has been achieved by designing the output speed for the memory to be greater than the input speed and by limiting reproduction to only every fourteenth line of the second program. The reduced picture consequently has a diminished resolution in the vertical direction.

SUMMARY OF THE INVENTION

The present invention is used in a television receiver circuit system which operates without the previsouly described memory and associated circuitry. The circuit system utilizes the fact that it is often sufficient to replace part of the picture of the main program with a mere part of the picture of the second program, since the viewer wishes merely to be informed as to whether the second program is of interest to him or her or whether it has already begun. This can be readily accomplished by viewing merely a sector of the picture transmitted for the second program. The circuit system replaces a quadrant of the picture of the main program with a sector of the picture of the second program. The sector of the second picture is not reduced in size, nor is the resolution changed. Both the remaining part of the main picture and the sector of the second picture are displayed exactly as broadcast.

Accordingly, the present invention is used in a television receiver with a picture screen on which a first program is televised, said television receiver having a circuit system by means of which at least a segment of a second transmitted video signal is made visible simultaneously, said segment replacing a segment of the simultaneously transmitted first transmitted video signal. Said circuit system includes a means for receiving, tuning and amplifying the video signals at intermediate frequency and a means for extracting from each signal the respective horizontal-frequency and vertical-frequency synchronizing pulses. The phase positions of the respective sync signals from each transmitter are compared by the phase-comparison circuit of this invention, said phase-comparison circuit chooses a rectangular portion of the picture of the second program to replace an equivalent-size rectangular quadrant of the main program. The quadrant of the main program is continually reselected to be free from synchronizing pulses of the second program. The bi-level output signal of the phase-comparison circuit is used to drive a switching means which alternately transmits first and second picture signals to the video-display means.

DESCRIPTION OF THE PREFERRED EMBODIMENTS

The present invention is based on the fact that transmitters using standard color television signals for the NTSC and PAL systems transmit video signals which have fixed ratios between the horizontal and vertical scanning frequencies and the color sub-carrier frequency. Since the frequency of the color sub-carrier is required to have an accuracy on the order of $10^{-6}$, the horizontal and vertical scanning frequencies from transmitter to transmitter are in close agreement. It is therefore possible to mix the video information of a first transmitter A with that of a second transmitter B, or to co-join the information of transmitter B with the information of transmitter A. However, due to very slight differences of frequency, the synchronizing pulses of transmitter B are generally shifted in phase with respect to the synchronizing pulses of transmitter A, and this phase shift results in the picture of transmitter B slowly shifting its position in relation to the picture of transmitter A. In addition, a fixed or non-time-varying phase displacement between the received synchronizing pulses of two transmitters may also result from relative geographical distances between the receiver and the transmitters. The synchronizing and blanking pulses contained in the video information of transmitter B, when super-imposed on a signal displayed from transmitter A, show themselves as broad black horizontal and vertical bars which move vertically and laterally as the phase of the two signals shift with respect to each other. If the screen is divided into four sectors, I, II, III, and IV, it will be seen from FIG. 4 that at any instant one sector of the picture from transmitter A is always free from the moving broad black horizontal and vertical bars caused by the shifting phase of the blanking pulses of transmitter B. The phase-comparison circuit of the present invention automatically selects this bar-free sector and reproduces therein a part of the picture transmitted from transmitter B.

Figure 2:
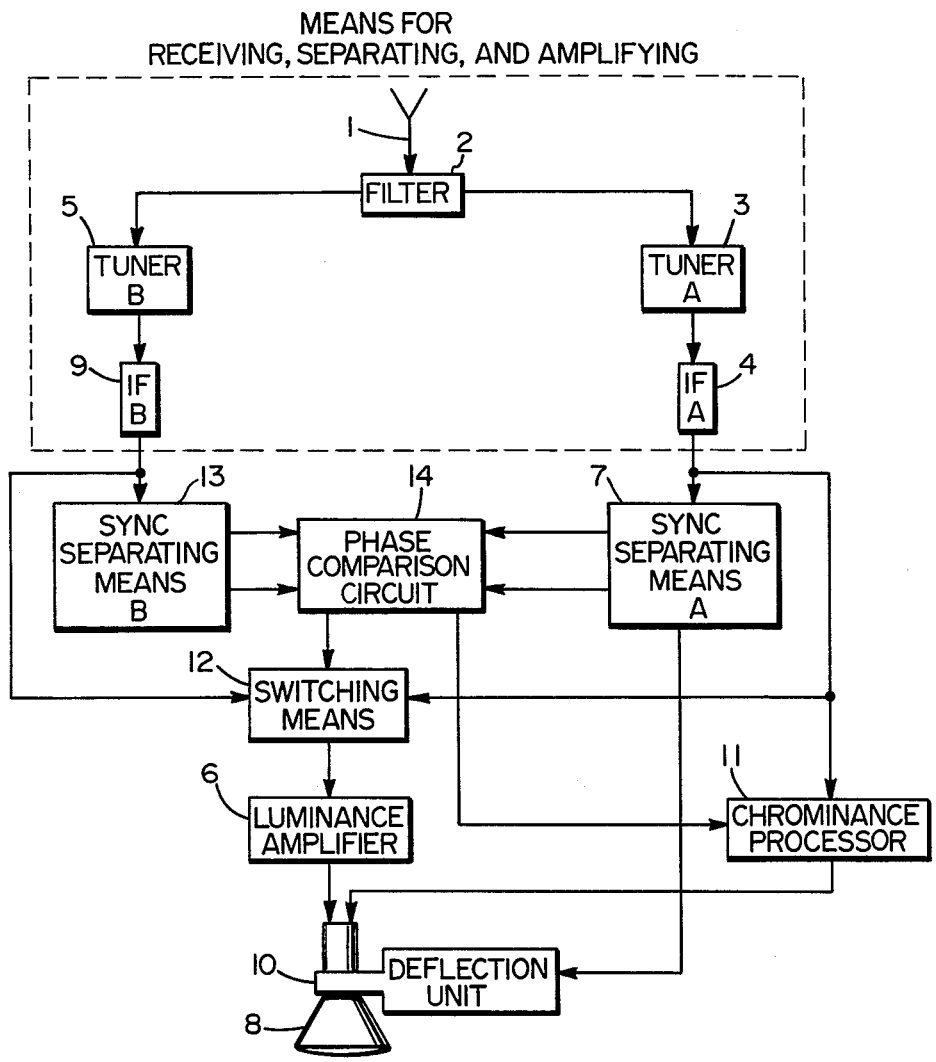
FIG. 2 is a block diagram of the circuit system with which this invention is used.

In the circuit system of FIG. 2, the television video signals of first and second transmitters, A and B, pass through means for receiving, tuning and amplifying said signals at intermediate frequency. Said means may include an antenna 1 connected to antenna filter 2, which in turn is connected to two intermediate frequency amplifiers 4 and 9 through separate tuners 3 and 5. It is assumed here that tuner 3 is tuned to transmitter A and tuner 5 is tuned to transmitter B. The signal from transmitter A is processed and reproduced on the picture tube 8 as the first or main program. The signal is processed in the usual manner through an IF amplifier 4 from which it passes through switching means 12, described later, to a video-display means comprised of luminance amplifier 6, television tube 8 and deflection unit 10. The synchronizing pulses from transmitter A are simultaneously processed in the sync-separating means 7 from which the deflection signals for the deflection unit 10 are obtained. In the circuit system of a color television receiver, the color signals pas through chrominance processor 11. The additional program from transmitter B is received by tuner 5, then processed through IF amplifier 9 from which it passes to the luminance amplifier 6 via switching means 12 to which the other program is also connected. In addition, the transmitter B signal of IF amplifier 9 is applied to sync-separating means 13 which delivers the horizontal-frequency and vertical-frequency synchronizing pulses to phase-comparison circuit 14, said pulses being compared with the transmitter A vertical-frequency and horizontal-frequency synchronizing pulses from the sync-separating means 7. The phase-comparison circuit 14 causes switching means 12 to operate dependent on the relative phase position of the synchronizing pulses, so that a part of the picture from the signal of transmitter B appears on the screen of the television tube 8. Switching means 12 thus transmits to luminance amplifier 6 that part of the picture transmitted by transmitter B which is free from horizontal and vertical synchronizing pulses. Where used in a color television receiver, the chrominance processor 11 may be blocked by a blocking pulse which inhibits processor 11 during display of the part of the picture from transmitter B. The circuit system of this invention may, of course, also be used with a black and white television receiver, in which case chrominance processor 11 is eliminated from the circuit system indicated in FIG. 2.

Figure 1:
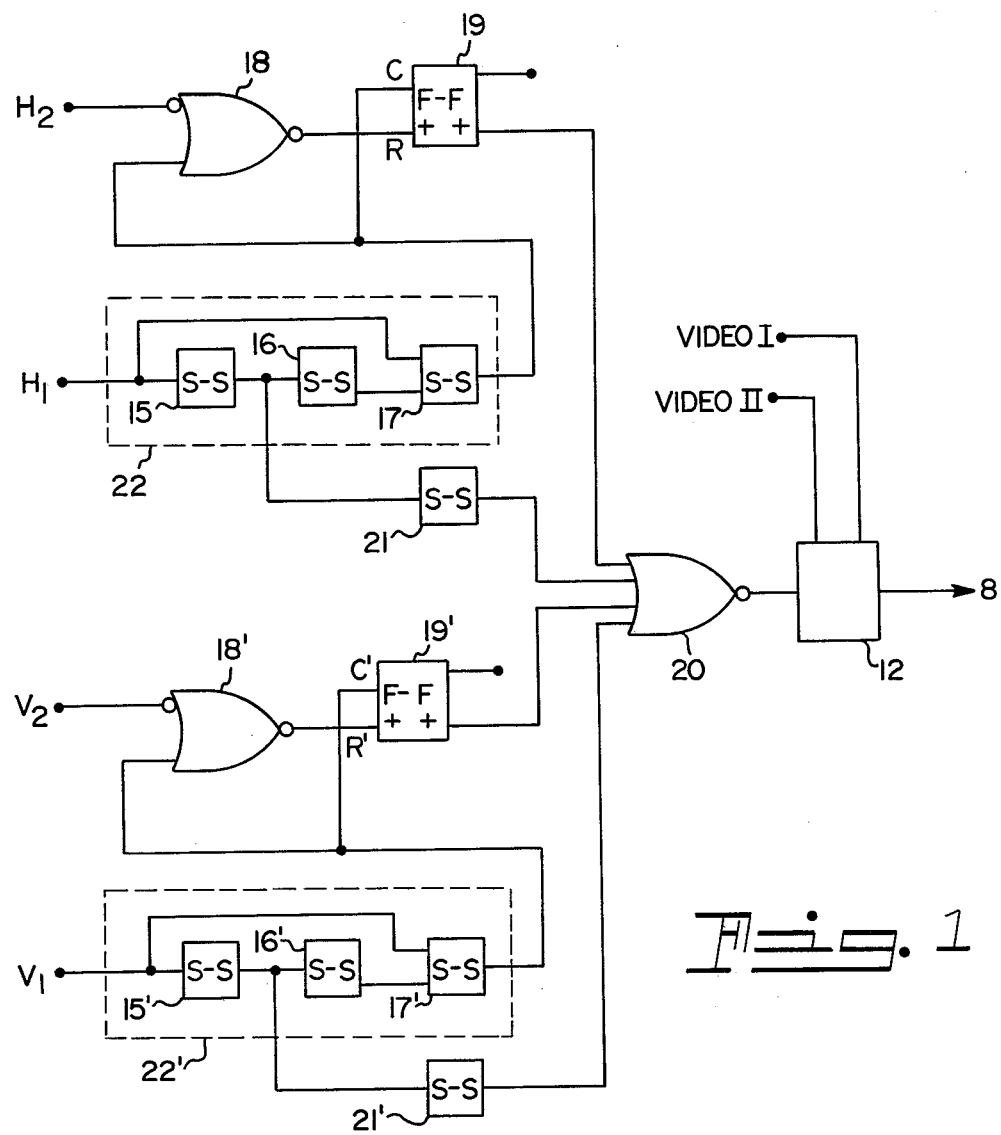
FIG. 1 is a detailed block diagram of a phase-comparison circuit of the present invention.

Referring now to FIG. 1 and the phase-comparison circuit of this invention, the horizontal sync pulses $H_1$ of the first television program are caused to be repeated at substantially the center of the time interval between said pulses by horizontal-sync-frequency-doubling means 22. The principal output of said frequency-doubling means 22 is comprised of a series of pulses occurring at beginning and at mid-line of the horizontal scan, as indicated in "22 OUT" of FIG. 3. One embodiment of said frequency-doubling means 22 is indicated in FIG. 1 as a tandem connection of a first one-shot multivibrator 15 and an optional second one-shot multivibrator 16. The input of multivibrator 15 is connected to sync-separating means 13 and said multivibrator 15 is triggered by the leading edges of horizontal sync pulses $H_1$. The trailing edge of the pulse of multivibrator 15 triggers optional multivibrator 16 and the output pulse of multivibrator 16 has a trailing edge occurring at substantially the center of the linesweep. Both the horizontal sync pulses $H_1$ and the output of optional one-shot multivibrator 16 are connected to the two inputs of a third dual-input one-shot multivibrator 17, which is triggered both by the leading edges of said horizontal sync pulses $H_1$ and by the trailing edges of the output pulses of one-shot multivibrator 16. The output of said dual-input one-shot multivibrator 17, which is also the principal output of frequency-doubling means 22, is a series of short pulses occurring at double the frequency of the horizontal sync pulses $H_1$. Input and output waveforms are illustrated in the first four lines of FIG. 3.

The principal output of horizontal-sync-frequency-doubling means 22 is connected to one input of horizontal-sync-comparison means 18 and is also connected to the clock-input C of horizontal clock means 19. The second input of said horizontal-sync-comparison means 18 is connected to the horizontal pulses $H_2$ of the second television program, a sector of which program is to replace a quadrant of the first television program. In the embodiment illustrated in FIG. 1 and described using FIG. 3, horizontal-sync-comparison means 18 is comprised of a NOR gate with an inhibited input to which the horizontal-sync-pulses $H_2$ are connected. The output of said horizontal-sync-comparison means 18 is a series of pulses in either the left or right half-line dependent upon whether the $H_2$ pulses occur during that half-line, as illustrated in the left and right examples of FIG. 3. Preferably, the pulses of the output of frequency-doubling means 22 should be made somewhat greater in length than the pulses $H_2$ of the second television video signal in order that the output of comparison means 18 will appear definitely in either the right or the left half of the line scan and not in both halves.

It is well known that the embodiment of sync-comparison means 18 may also be an AND circuit with one inhibited input connected to the principal output of frequency-doubling means 22 and with a second input coupled to the source of pulses $H_2$. As is apparent to those skilled in the art, numerous other combinations of inverters and gate circuits may be used to accomplish the comparison function described.

Figure 3:
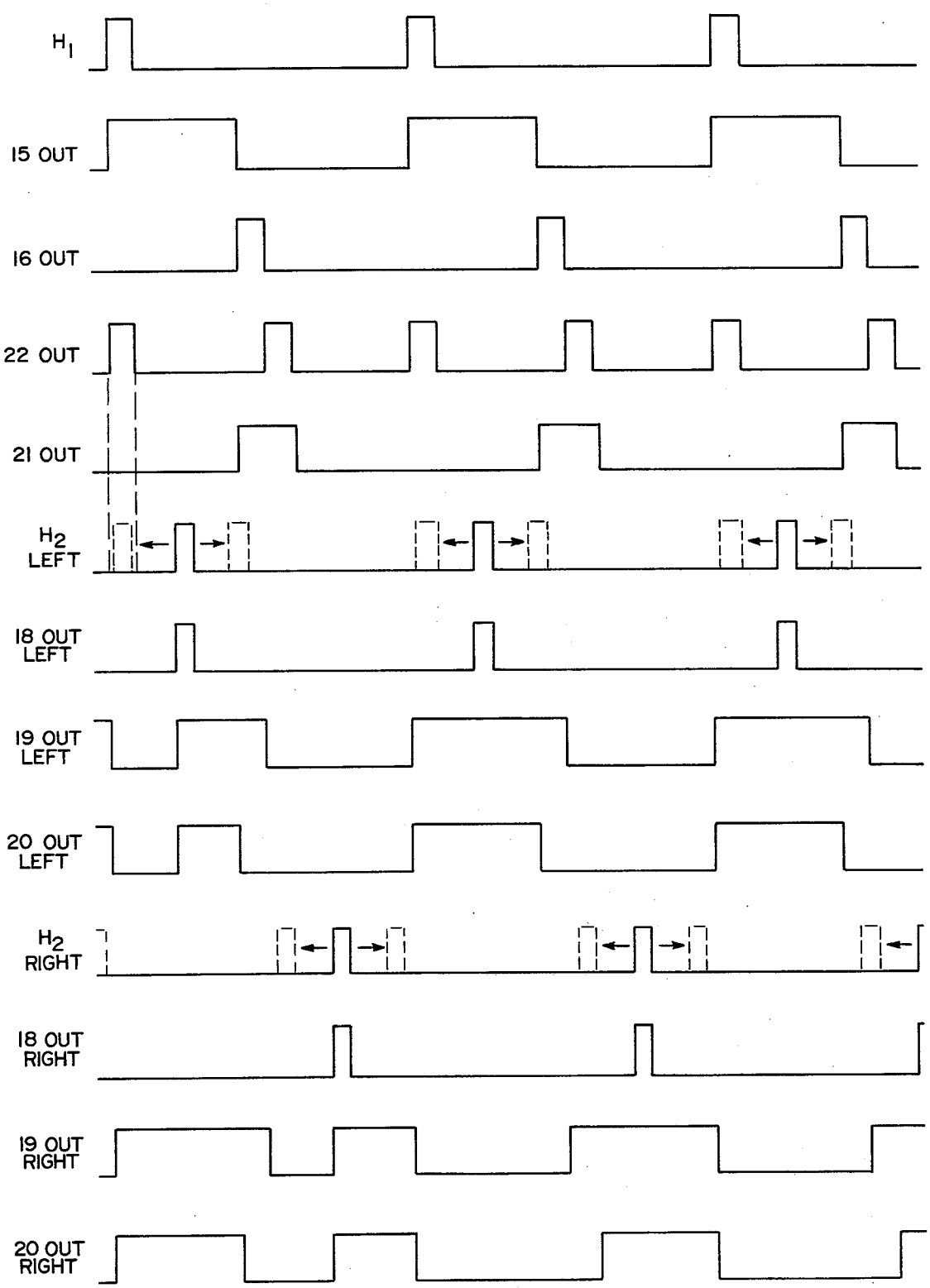
FIG. 3 is a pulse diagram for use in explaining operation of the phase-comparison circuit of FIG. 2.

The output of said sync-comparison means 18 is connected to the reset input R of horizontal-clock means 19. Horizontal-clock means 19 may be a complementing flip-flop of the J-K type which is triggered by clock impulses from the principal output of frequency-doubling means 22 and which is provided with a reset input. The reset input R, when triggered, causes the output to switch to one of two bi-level states if the output is not already switched to that state. Either the J or the K input of a J-K flip-flop may be fixed at high or low level, for example, and the reset impulses applied to the remaining input. In the pulse diagrams of FIG. 3, a high reset input from sync-comparison means 18 causes the output of clock means 19 to switch to the high state. Switching does not take place if the output is at its high state at the time the reset impulse is applied. Therefore, as indicated in FIG. 3, the output of clock means 19 is high only during the first (left) half of the horizontal line sweeps corresponding to the first video signal if the horizontal sync pulses H₂ of the second video signal occur during said first (left) half. Similarly, the output is high only during the second (right) half during time intervals when the horizontal sync pulses H₂ occur during the second (right) half of the line sweeps corresponding to the first video signal.

Figure 4:
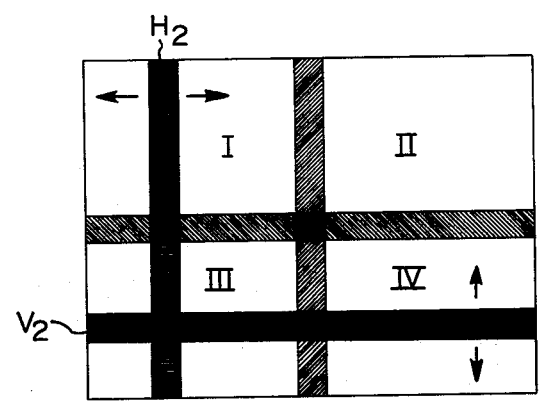
FIG. 4 indicates a television picture frame divided into sectors for the purpose of explaining the operation of phase-comparison circuit of this invention.

Because the horizontal blanking pulses of the second video picture are wider than the synchronizing pulses due to the width of the front and back porches, a part of the moving vertical bar of FIG. 4 will extend into the bar-free sector prior to the switching which changes quadrants. This objectional apsect may be eliminated by providing inhibiting pulses from the output of horizontal-center-blanking one-shot multivibrator 21. Multivibrator 21 is triggered by the trailing edge of the output of oneshot multivibrator 15, said trailing edge occurring shortly prior to the time the beam reaches the center of its sweep. The length of the output pulse of multivibrator 16 must therefore be greater than the length of the back porch of the blanking pulse. Furthermore, the length of the output pulse of horizontal-center-blanking one-shot multivibrator 15 must be greater than the length of the horizontal blanking pulse including both front and back porches. The vertical shaded are of FIG. 4 corresponds to the area blanked by multivibrator 21.

In corresponding manner the vertical synchronizing pulses V₁ of the first broadcast picture are doubled in frequency by vertical-sync-frequency-doubling means 22'. The output of means 22' is connected to vertical-sync-comparison means 18' and to the clock input C' of vertical-clock means 19' vertical-clock means 19' also changes plane 180 degrees when the output of vertical-sync-comparison means indicates that the vertical sync pulses V₂ of the second video program have moved from top half to bottom half, or vice-versa, of the first video picture. The objectional view of the vertical blanking bar may be eliminated by use of a vertical-center-blanking one-shot multivibrator 21'.

The outputs of horizontal-clock means 19 and vertical-clocks means 19' are compared at the input of switch signal means 20, 20, which is shown in FIG. 2 as a NOR gate. The outputs of center-blanking multivibrators 21 and 21' as well as the outputs of any multivibrators used to inhibit switching at the top, bottom or sides of the picture may also be connected to switch-signal means 20. In the embodiment shown in FIG. 1, the bi-level output of switch-signal means 20 will be high only during those periods of time corresponding to that quadrant of the first video picture during which no horizontal pulses H₂ and no vertical pulses V₂ of the second picture occur. Example outputs of switch-signal means 20 are indicated in FIG. 3 for both the right and the left half of the picture screen. The illustrated outputs will, of course, occur either during the top or the bottom half of the picture, but not both halves simultaneously.

The output of switch-signal means 20 is used to control switching means 12 is alternately linking the first and second signal to video display means 8. The output may also be used to kill the output signal of chrominance processor 11.

The color sub-carrier signals radiated by the first and the second transmitter have a standardized tolerance of ± 10 Hz for both NTSC and PAL specifications. Since the horizontal and vertical synchronizing pulse frequencies are rigidly coupled fractional sub-harmonics of the frequencies of the color subcarriers, and since the horizontal and vertical frequencies are much smaller in value, they coincide with much greater accuracy than the ± 20 Hz tolerance between station color sub-carriers. However, in general, a slight difference in the synchronizing pulse frequencies of two broadcast transmitters will always be present. The slight difference is regarded as an advantage, because the resulting phase change not only causes shifting of the sector of the second picture from quadrant to quadrant of the main picture but also causes all parts of the second picture to be periodically seen by the viewer, thus considerably increasing viewer information concerning the content of the second program.

While a particular embodiment of the present invention has been described and shown, it will be obvious to those who are skilled in the art to which the invention pertains that changes and modifications may be made without departing fron the spirit and scope of the invention as set forth in the appended claims.

What I claim is:

1. A phase-comparison logic circuit for use in a television receiver to provide a bi-level switching signal one level of which agrees with periods of time during which the video signal corresponds to a quadrant of a first broadcast television program, said quadrant being free from the horizontal and vertical synchronizing pulses of the video signal of a second broadcast program, comprising:

horizontal-sync-frequency-doubling means with input connected to the horizontal sync pulses of said first broadcast program;

horizontal-syn-comparison means with one input connected to the output of said horizontal-sync-frequency-doubling means and with a second input connected to the horizontal sync pulses of said second broadcast program;

horizontal-clock means with clock input connected to the output of said horizontal-sync-frequency-doubling means and with reset input connected to the output of said horizontal-sync-comparison means;

vertical-sync-frequency-doubling means with input connected to the vertical sync pulses of said first broadcast program;

vertical-sync-comparison means with one input connected to the output of said vertical-sync-frequency-doubling means and with a second input connected to the vertical pulses of said second broadcast program;

vertical-clock means with clock input connected to the output of said vertical-sync-frequency-doubling means and with reset input connected to the output of said vertical-sync-comparison means; and switch signal means with one input connected to the output of said horizontal-clock means and a second input connected to said vertical clock means and having said bi-level switching signal output.

2. The logic circuit of claim 1 wherein each of said sync-frequency-doubling means further comprises:

a first one-shot multivibrator with input connected to said sync-frequency pulses; and a dual-input one-shot multivibrator with one input connected to said sync-frequency pulses the other input connected to the output of said first one-shot multivibrator, the output connected to the clock input of said clock means.

3. A logic circuit of claim 1 wherein each of said sync-comparison means is comprised of a NOR circuit with an inhibited input connected to the synchronizing pulses of said second broadcast stations.

4. The logic circuit of claim 1 in which said switch-signal means is comprised of a NOR circuit.

5. The logic circuit of claim 2 in which a second one-shot multivibrator is connected to said output of said first one-shot multivibrator, said other input of said dual-input one-shot multivibrator is connected to said second one-shot multivibrator and in which the input of a center-blanking one-shot multivibrator is connected to output of said first one-shot multivibrator, the output of each of said center-blanking one-shot multivibrators connected to inputs of said switch signal means.

6. The logic circuit of claim 1 in which each of said clock means is comprised of a complementing flip-flop with a clock input and a reset input.

7. The logic circuit of claim 1 in which said horizontal-sync-comparison means is comprised of an AND circuit with an inhibited input connected to the output of said frequency-doubling means.

* * * * *